No. 621,562. Patented Mar. 21, 1899.
L. J. W. H. GIFFHORN.
CUTTING APPARATUS FOR MOWING MACHINES.
(Application filed Sept. 3, 1897.)
(No Model.)
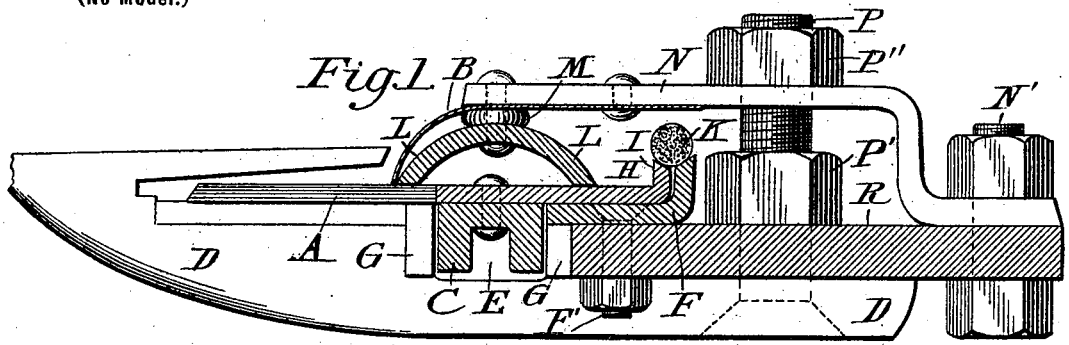
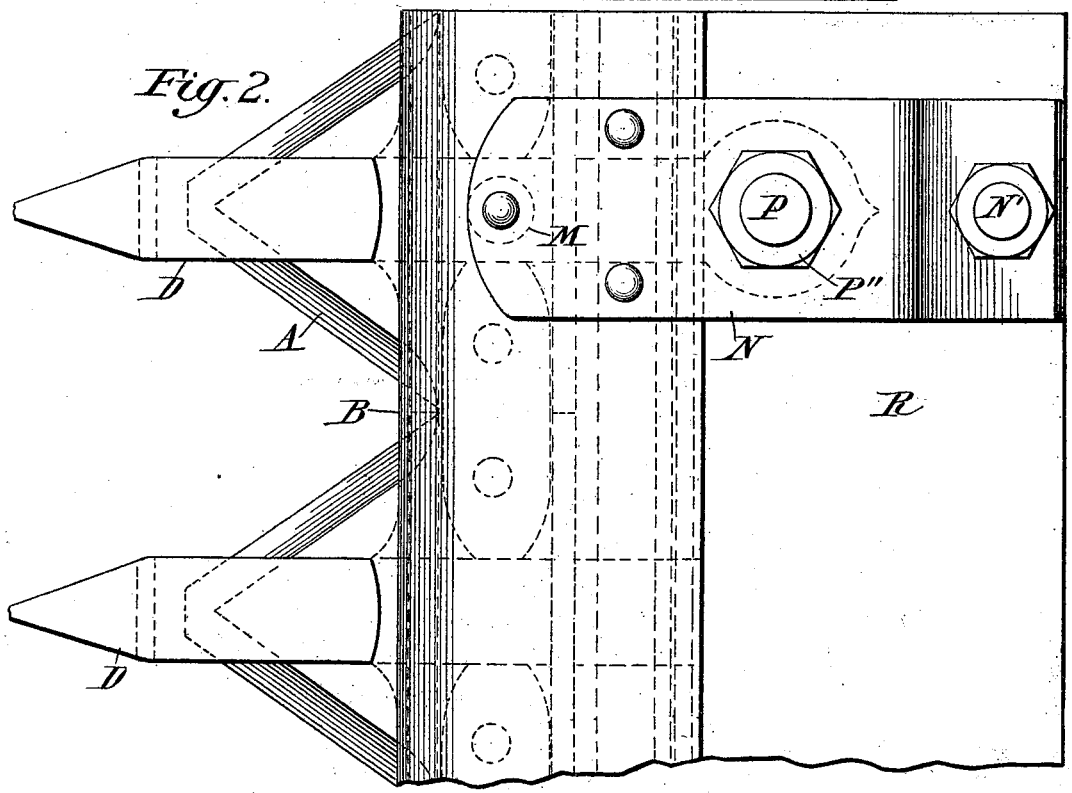
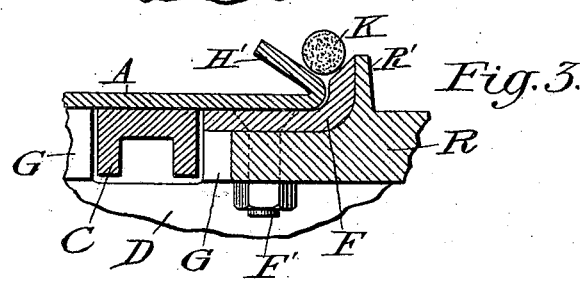
Witnesses:
Inventor.

UNITED STATES PATENT OFFICE.

LUDWIG JUL. WILH. HENRY GIFFHORN, OF SPOTSWOOD, NEW JERSEY, ASSIGNOR TO OTTO GIFFHORN, OF SAME PLACE.

CUTTING APPARATUS FOR MOWING-MACHINES.

SPECIFICATION forming part of Letters Patent No. 621,562, dated March 21, 1899.

Application filed September 3, 1897. Serial No. 650,543. (No model.)

*To all whom it may concern:*

Be it known that I, LUDWIG JULIUS WILHELM HENRY GIFFHORN, a citizen of the United States, residing at Spotswood, in the county of Middlesex and State of New Jersey, have invented a new and useful Cutting Apparatus for Mowing-Machines, of which the following is a specification.

My invention relates to improvements in the cutting apparatus of mowers and reapers; and the objects of my improvements are to give the working parts better wearing surfaces and to provide them with oil, which latter can be caught better by the upturned edges and guided into the space between the surfaces of the parts working and rubbing against each other, which besides making the parts more durable will provide for a better and lasting cut. Furthermore, to provide an adjustable presser device which will hold the knives in their proper place, so that the cut of the shears will be more even and lasting, and also to provide a cover extending over the whole apparatus to keep out dust, ground, stones, &c., and to afford a smooth passage-way for the cut grass, clover, or grain, which will lighten the draft of the machine.

In the drawings, Figure I is a cross-section of the whole apparatus. Fig. II is a lengthwise plan of the apparatus. Fig. III is a sectional view showing a different way in which the invention can be used.

In the drawings, R is the finger-bar, to the forward under surface of which are attached the fingers D by bolts P and nuts P'. Through the fingers D, between the bracing projections G thereof, a transverse passage-way E is formed to receive and guide the knife-bar C, to which the knives A are secured by rivets or other suitable means. The knife-blades are extended rearward, as shown at H, behind the knife-bar for about one inch more than is usual in the construction in general use, and has its rear edge I upturned. To the forward upper surface of the finger-bar a wear-plate F is secured by bolts F' or other suitable attaching means. This wear-plate F is a broad steel rail which extends along the whole length of the cutting apparatus in one continuous piece and furnishes a solid bearing for the rearward extensions H of the knives A. The rear edge of the wear-plate is upturned, and this upturned edge forms a support to sustain the upturned edges of the knives.

The top surface of the rear extensions of the knife and wear-plate are inclined toward each other to form a groove or channel to receive the lubricant. The groove or channel formed by the upper surfaces of the projecting portions of the knives and wear-plate may receive an oiling-rope K, which extends throughout the entire length of the cutting apparatus, and is oiled from above or from the side to slowly yield up the oil in small quantities to the space between the knives and wear-plate. If desirable, the rope may be dispensed with and the oil poured directly into the groove or channel, from whence it will run into its proper place.

To retain the knives in their proper place, a presser device is used, comprising a double rail L L, which extends longitudinally over the knives and knife-bar. Said double rail is adjustably held in contact with the upper surface of the knives by means of steel spring-keepers N. The keepers N are bolted to the finger-bar at their rear ends by means of bolts N' and are adjusted at their front ends by nuts P'' on the bolts P, which pass through perforations in the keepers. Between the double rail L L and the keepers N springs M are placed to allow the double rail to yield to accommodate inequalities in the knives.

To protect the cutting apparatus and oiling-groove from dust and grass and to afford a smooth passage-way for the cut grass, I provide a cover-plate B, of thin sheet metal. Said cover-plate is bent down at its forward edge to come into close relation with the knives and is supported by and projects rearward over the double rail L L.

The double rail L L affords a broader bearing-surface for the top of the knives and holds the knives more firmly and evenly in position than would a single rail. This rail may be made in longitudinal sections placed end to end instead of a single piece.

The modification shown in Fig. III shows the upwardly-projecting rear edge H' of the knives bent forward at the upper edge instead of projecting vertically and being cut away to form an inclined surface, as shown in Fig. I. This figure, furthermore, shows an integral upwardly-projecting rib R' on the finger-bar for supporting the upwardly-projecting portions of the wear-plate.

What I claim as my invention is—

1. The combination in the cutting apparatus of a mowing-machine of the steel wear-plate with upturned rear edge, the reciprocating cutter having a wearing-plate provided with an upturned rear edge, the upper portion of the said upturned edges being oppositely beveled, and an oiling-rope extending lengthwise of the apparatus above the upturned edges, all substantially as set forth, for the purpose specified.

2. The combination in the cutting apparatus of a mowing-machine of the steel wear-plate with upturned rear edge, the reciprocating cutter having a wearing-plate provided with an upturned rear edge, the upper portion of the said upturned edges being oppositely beveled, an oiling-rope extending lengthwise of the apparatus above the upturned edges, and a cover-plate therefor, substantially as set forth, for the purpose specified.

3. The combination in the cutting apparatus for a mower or reaper of spring-keepers N, adjusting-bolts P therefor, a double bearing-rail L L, with springs M interposed between said spring-keeper and said bearing-rail, substantially as described.

4. The combination in a cutting apparatus for a mower or reaper of spring-keepers N, adjusting-bolts P therefor, a double bearing-rail L L, with springs M interposed between said spring-keepers and said bearing-rail, and a cover-plate B, substantially as described.

Dated September 1, 1897.

LUDW. JUL. WILH. HENRY GIFFHORN.

Witnesses:
FREDERICK WEIGEL,
MICHAEL O'CONNOR.